US011390255B1

(12) United States Patent
Froboese et al.

(10) Patent No.: US 11,390,255 B1
(45) Date of Patent: Jul. 19, 2022

(54) TURNTABLE ROTATION DEVICE FOR ASSISTING WITH SAFE AND CONTROLLED DIRECTIONAL MOVEMENT AND PIVOTING OF STATIONARY MOTORCYCLES

(71) Applicants: Scott A. Froboese, Southaven, MS (US); Thomas J. Busler, Hernando, MS (US)

(72) Inventors: Scott A. Froboese, Southaven, MS (US); Thomas J. Busler, Hernando, MS (US)

(73) Assignee: SPINCYCLE LLC, Southaven, MS (US)

( * ) Notice: Subject to any disclaimer, the term of this patent is extended or adjusted under 35 U.S.C. 154(b) by 0 days.

(21) Appl. No.: 17/336,241

(22) Filed: Jun. 1, 2021

(51) Int. Cl.
*B60S 13/02* (2006.01)
*A47F 5/025* (2006.01)
*B62H 3/00* (2006.01)

(52) U.S. Cl.
CPC .............. *B60S 13/02* (2013.01); *A47F 5/025* (2013.01); *B62H 3/00* (2013.01)

(58) Field of Classification Search
USPC ............................. 248/349.1, 346.01, 346.5
See application file for complete search history.

(56) References Cited

U.S. PATENT DOCUMENTS

| 3,566,798 | A | * | 3/1971 | Peitzman | ................ B60S 13/02 104/44 |
| 4,608,929 | A | * | 9/1986 | Park | ........................ B60S 13/02 104/38 |
| 4,716,837 | A | | 1/1988 | Valencia | |
| 5,086,704 | A | | 2/1992 | Mueller | |
| 5,400,550 | A | * | 3/1995 | Beasley | .................. E04B 1/346 104/35 |
| 5,749,556 | A | * | 5/1998 | Matsuoka | .............. F16M 11/08 248/349.1 |
| 6,817,300 | B2 | * | 11/2004 | Schwenker | ................ B61J 1/02 104/44 |
| 2019/0389436 | A1 | | 12/2019 | Mondro et al. | |

* cited by examiner

*Primary Examiner* — Alfred J Wujciak
(74) *Attorney, Agent, or Firm* — Hulsey P.C.

(57) ABSTRACT

The present invention discloses a turntable for the rotation of automobiles, other motor vehicles, and displays. The turntable includes base arc and centering segments, arm and deck segments. The deck segment receives a vehicle. The turntable includes a center hub connecting the deck segments. The center hub comprises a center plate. The turntable includes rotating arms extending from the center plate. The turntable comprises a gear segment connected to the arms. The gear segment connects to a drive shaft via a worm gear. The turntable includes a motor connecting the drive shaft. The motor engages the drive shaft causing the gear to rotate, which in turn rotates the gear segment. Rotation of the gear segment causes the arms to rotate with support from the roller assemblies. Rotation of the arms rotates the center hub, which in turn rotates the deck segments with the vehicle.

9 Claims, 12 Drawing Sheets

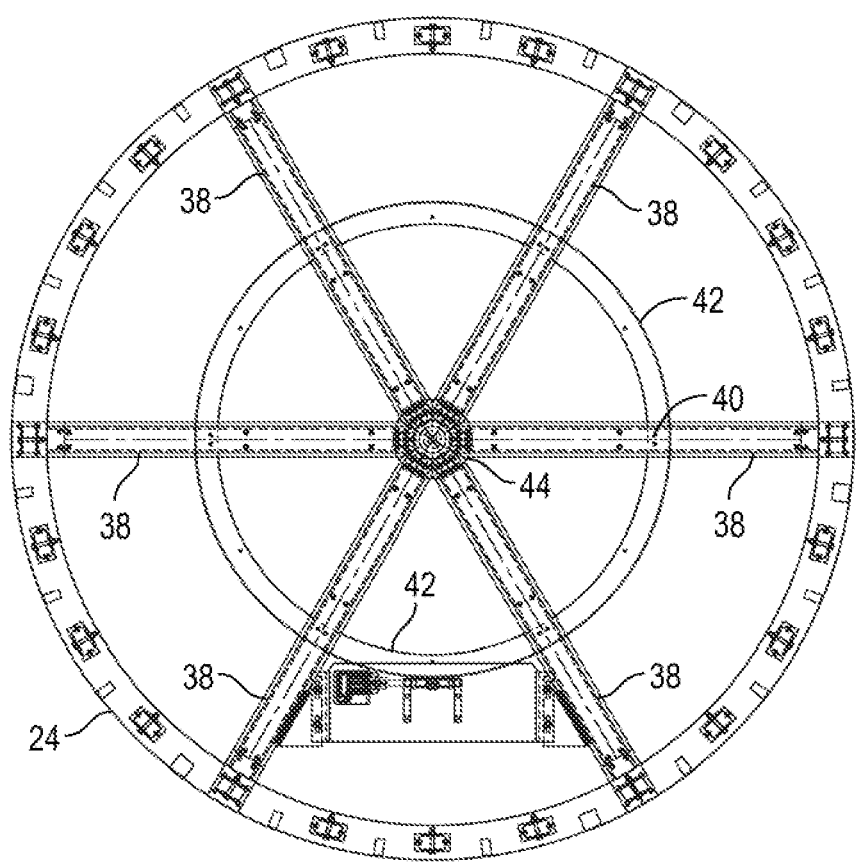
FIG. 3A
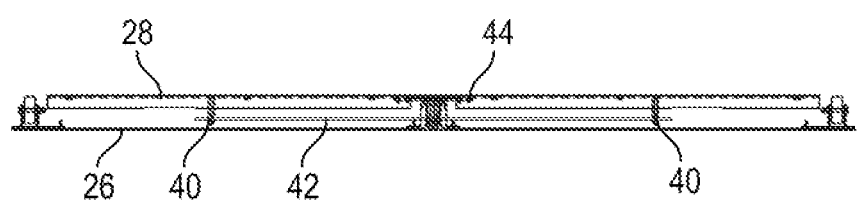
FIG. 3B
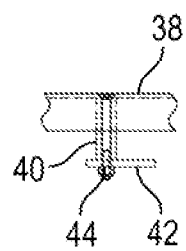 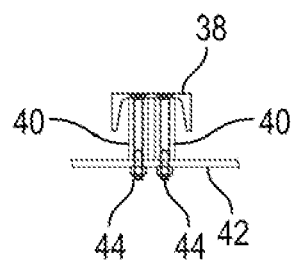
FIG. 4A          FIG. 4B

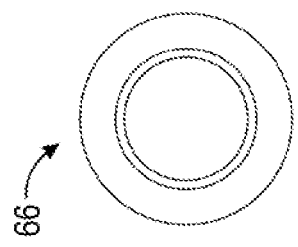
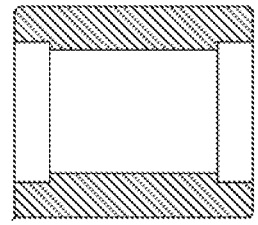
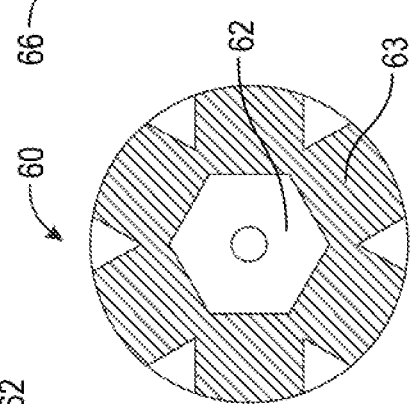
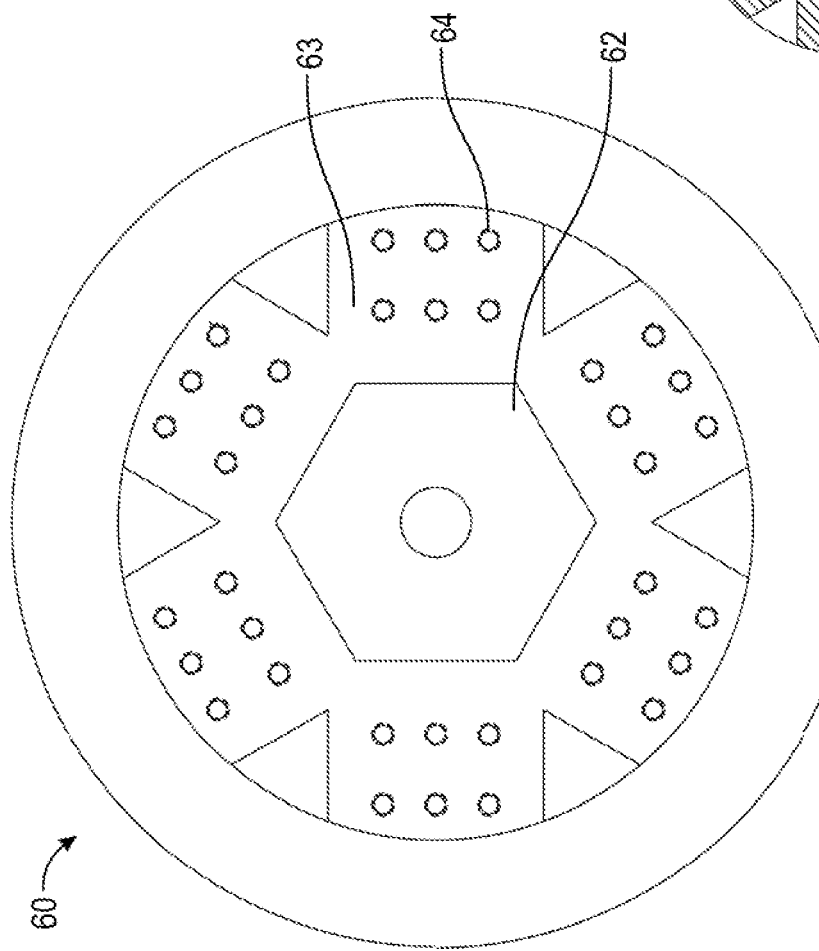

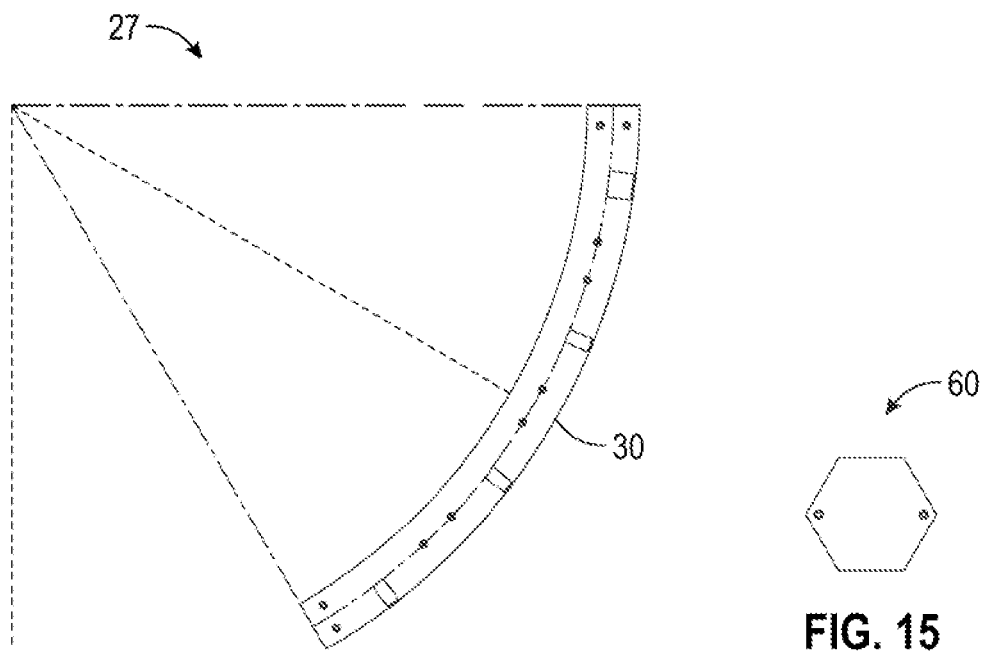
FIG. 14
FIG. 15
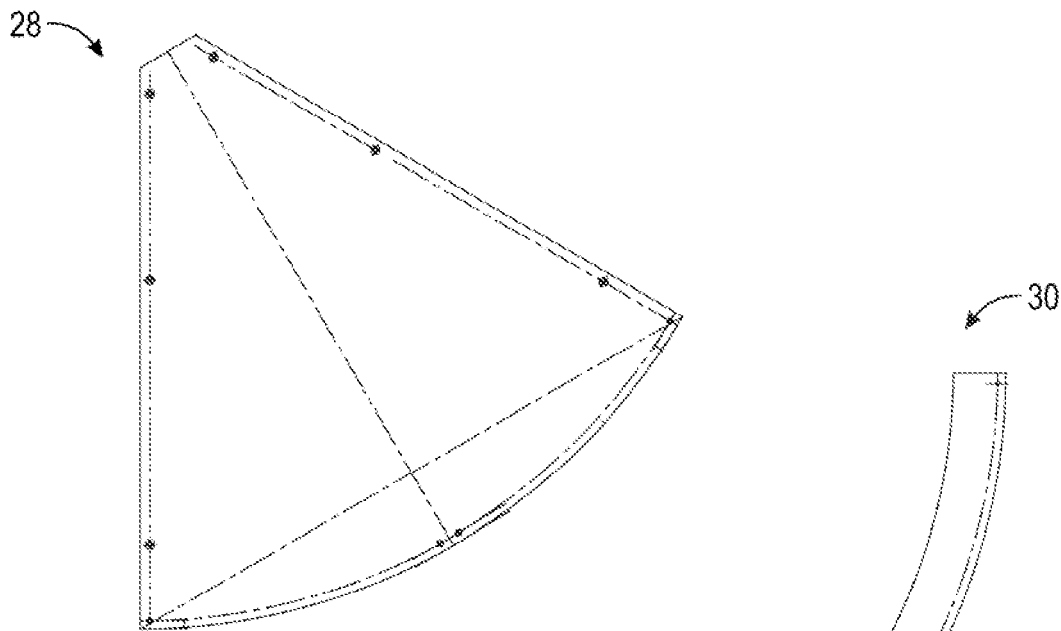
FIG. 16
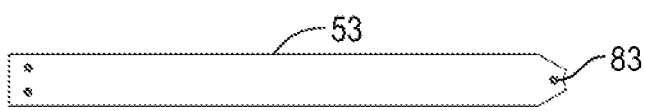
FIG. 17
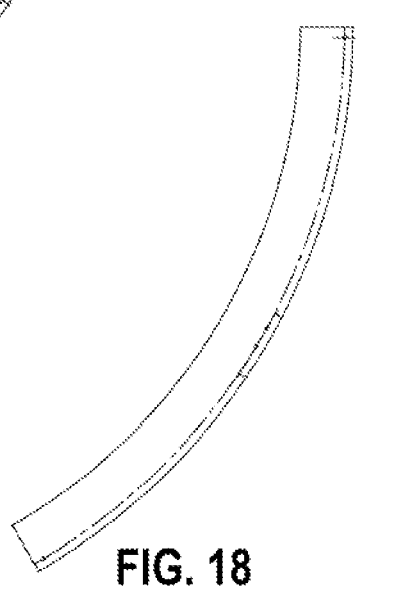
FIG. 18

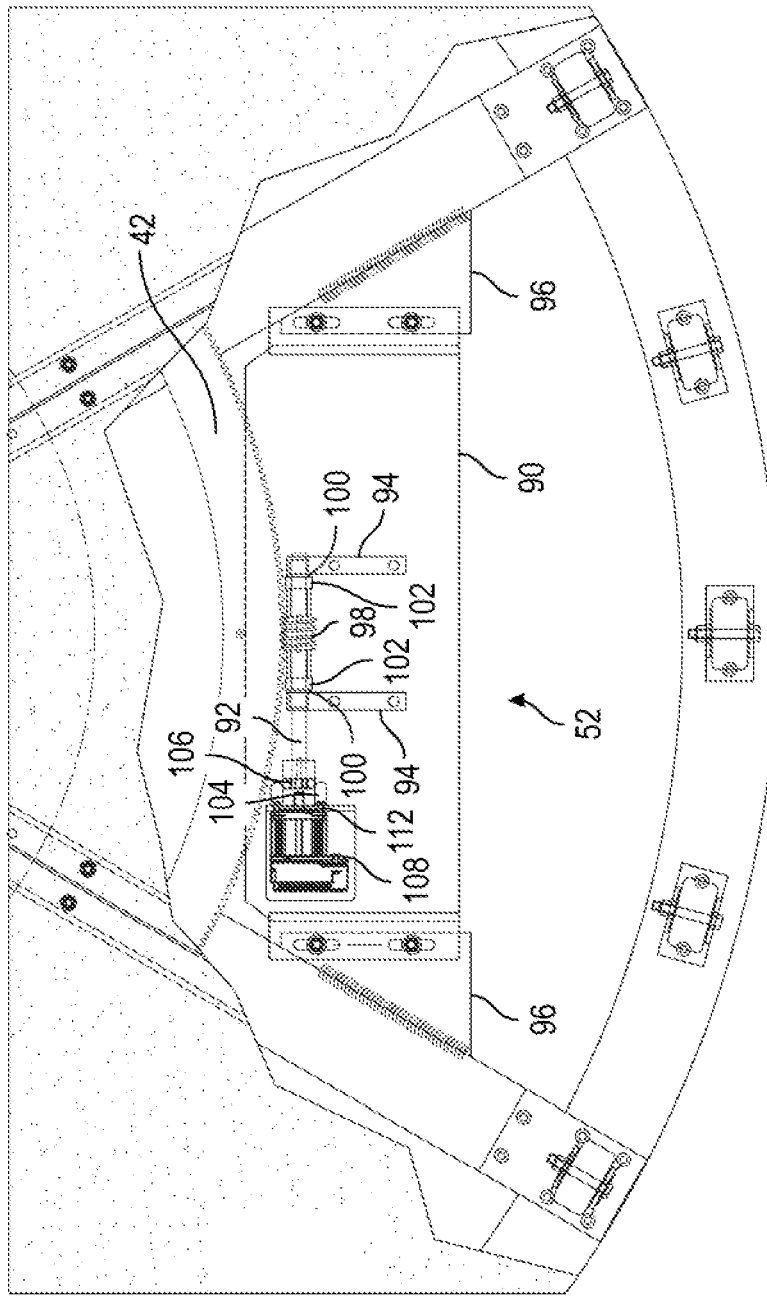
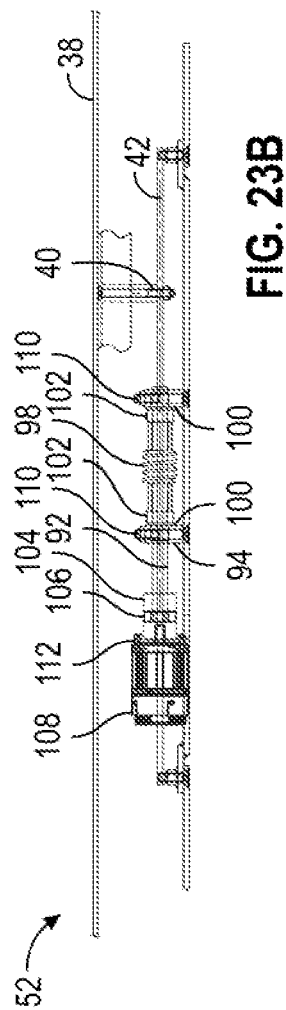
FIG. 23A
FIG. 23B

TURNTABLE ROTATION DEVICE FOR ASSISTING WITH SAFE AND CONTROLLED DIRECTIONAL MOVEMENT AND PIVOTING OF STATIONARY MOTORCYCLES

FIELD OF THE INVENTION

The present subject matter generally relates to a field of turntables. More specifically, the present subject matter relates to a turntable for the rotation of motorcycles. Yet more specifically, the presently disclosed subject matter provides rotation device for assisting with safe and controlled directional movement and pivoting of stationary motorcycles.

BACKGROUND OF THE INVENTION

It is known that turntables are generally used for rotation of automobiles, other vehicles and/or displays. The turntables provide a platform, which is flush with a surrounding surface or suspended above the ground and is circular with a pivot point at a center thereof. The platform couples to a rotational motor through gearing systems.

Several turntables have been disclosed in the past that help to rotate vehicles, heavy equipment or displays. One such example is disclosed in a United States published application No. 20190389436 entitled "Vehicle Turntable" (the "'436 Publication"). The '436 Publication discloses a vehicle turntable comprising a central hub communicatively coupled to a control unit for receiving control signals; a plurality of wedge-shaped panels radially coupled to the central hub so as to form a circular surface; a plurality of wheels coupled to a number of the plurality of panels; and at least one motor configured to drive a corresponding one of the plurality of wheels and to receive the control signals from the central hub. Embodiments also include a system comprising a first turntable hub configured to control operation of a first turntable; and a control unit communicatively coupled to the first turntable hub to provide control signals to the first turntable hub.

Another example is disclosed in a U.S. Pat. No. 5,086,704 entitled "Motor Vehicle Turntable" (the "'704 Patent"). The '704 Patent discloses an improved motor vehicle turntable that may be installed in any location, typically in front of a garage for the purpose of rotating a vehicle so as to enable it to leave the area in the opposite direction from which it entered the garage. The motor vehicle turntable has a circular vehicle receiving platform supported by a polygonal support frame. The receiving platform and support frame are received within a cylindrical pit so that the upper surface of the platform is level with the surrounding terrain into which the pit is formed. A chain drive frictionally engages the perimeter of the polygonal support frame to rotate the receiving platform when the chain is moved by means of a drive motor and sprocket arrangement. The drive motor and sprocket arrangement provide a spring biasing to the chain to frictionally engage the perimeter of the support frame under normal operating conditions, but which permits loosening of the chain to manually rotate the receiving platform and support frame if there is a power outage or equipment malfunction.

Another example is disclosed in a U.S. Pat. No. 4,716,837 entitled "Automobile Turntable" (the "'837 Patent"). The '837 Patent discloses a turntable for positioning a parked vehicle is disclosed herein having a revolving platform operably mounted on a portable base with driving mechanism interconnecting the base with the platform. Rollers movably support the platform on the base in combination with reinforced tracks. Wheel stops are incorporated into the top surface of the platform for releasably retaining the vehicle in a parked position during operation of the turntable and remote controls as well as manual controls are employed for starting and stopping the operation.

The above discussed turntables have several disadvantages. For example, the turntables are extremely heavy, require on-site construction and assembly, and are very expensive. As a result, they cannot be used in narrow driveways, automobile showrooms, garages or the like to change the direction of the vehicle.

Therefore, there is a need for an improved turntable that is relatively inexpensive and easily assembled, that is readily operated to change the direction of a vehicle when there is not adequate room to turn the vehicle as it is being operated.

BRIEF SUMMARY OF THE INVENTION

It is an object of the present invention to provide a turntable that allows the direction of a vehicle to be changed easily and avoids the drawbacks of known turntables.

It is another object of the present invention to provide a turntable that can be used in narrow garages, automobile showrooms, factories, or the like, to change the direction of displays.

It is another object of the present invention to provide a motorized turntable, which may be assembled on site and installed in a driveway or garage for rotation of vehicles.

In order to overcome the limitations here stated, the present invention provides a turntable for the rotation of motorcycles and displays. The turntable includes base arc and centering segments and deck segments. The base arc and centering segments with roller assemblies and motor is firmly attached to the floor. Wedge-shaped deck segments receive a motorcycle. The turntable includes a center hub connecting the deck segments. Here, the center hub acts as a pivot point for rotating the turntable. The turntable includes C-Channel arms extending from the center plate and connecting the deck plates.

In accordance with the present invention, the center plate comprises a hexagonal section with milled/machined areas. The rotating arms connect to the hub in the machined areas. The turntable comprises gear segments connected to the arms via a spacer. The gear segment spacer provides a gap between the arms and the gear segment and ensures they do not come in contact during operation of the turntable.

The gear segment connects to a drive shaft via a worm gear. The turntable includes a motor connecting the drive shaft. A user operates the motor via controller or remote controller. The motor engages the drive shaft causing the worm gear to rotate, which in turn rotates the gear segment. Rotation of the gear segment causes the arms to rotate with support from the roller assemblies. Rotation of the arms rotates the center hub, which in turn rotates the deck segments with the vehicle.

When a user activates the remote control, the turntable rotates clockwise at a set speed.

In one advantageous feature of the present invention, the turntable provides a smooth operation with minimum noise. Further, the turntable mounts easily and is readily operated to change the direction of a motorcycle when there is not adequate room to turn the vehicle as it is being operated.

The turntable allows the motorcycle to be rotated from facing forward to 180 degrees from that position, thereby minimizing the likelihood of back-over and reversing accidents in garages, for example.

In yet another advantageous feature of the present invention, the turntable allows parking, displaying, rotating and maneuvering motorcycles or other large or heavy items.

Features and advantages of the invention hereof will become more apparent in light of the following detailed description of selected embodiments, as illustrated in the accompanying FIGURES. As will be realized, the invention disclosed is capable of modifications in various respects, all without departing from the scope of the invention. Accordingly, the drawings and the description are to be regarded as illustrative in nature.

BRIEF DESCRIPTION OF THE DRAWINGS

The present invention will now be described in detail with reference to the drawings, which are provided as illustrative examples of the invention as to enable those skilled in the art to practice the invention. It will be noted that throughout the appended drawings, like features are identified by like reference numerals. Notably, the FIGURES and examples are not meant to limit the scope of the present invention to a single embodiment, but other embodiments are possible by way of interchange of some or all of the described or illustrated elements and, further, wherein:

FIGS. 3A and 3B illustrate a top and a side view, respectively of a base with arc sections and stationary centering members;

FIGS. 4A and 4B illustrate a front and side view, respectively of a gear segment spacer connecting an arm and a gear segment;

FIGS. 10A and 10B illustrate a top and side view, respectively of the center plate;

Figure 12A:
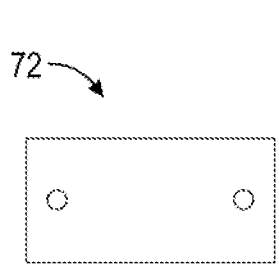
Figure 12B:
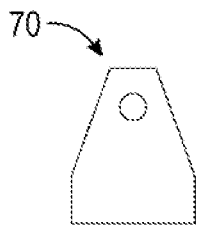
Figure 12C:
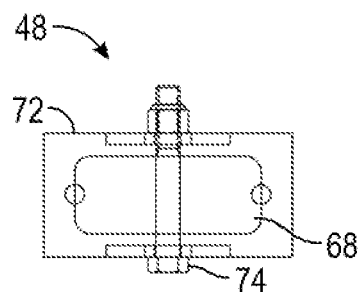
Figure 12D:
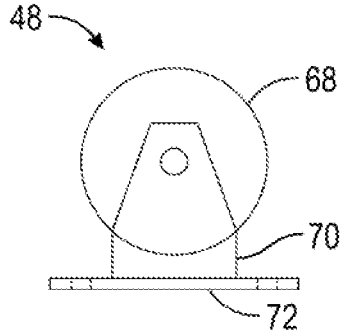
Figure 12E:
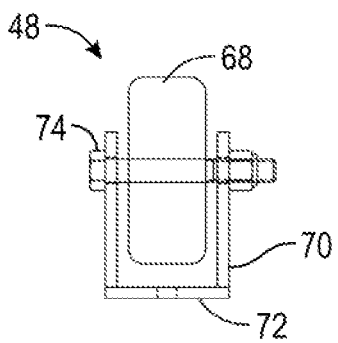
Figure 13A:
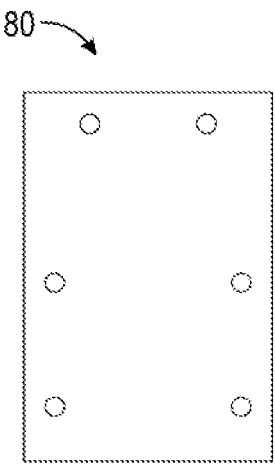
Figure 13B:
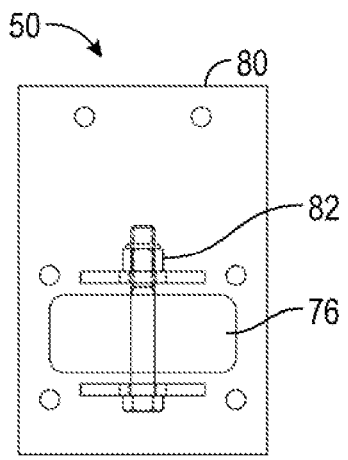
Figure 13C:
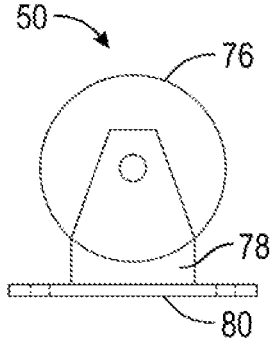
Figure 13D:
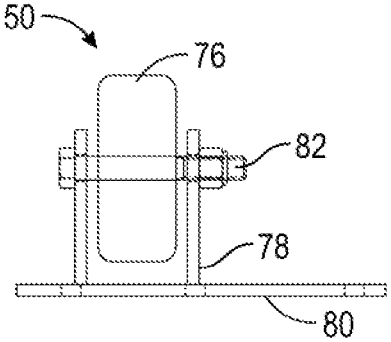
Figure 19A:
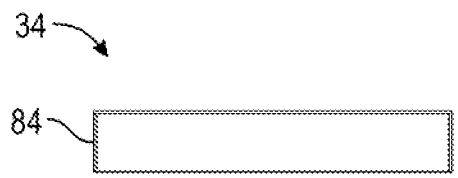
Figure 19B:
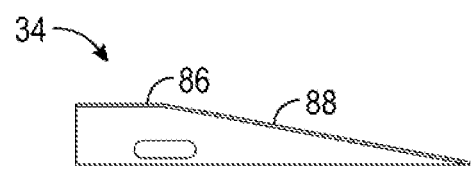
Figure 19C:
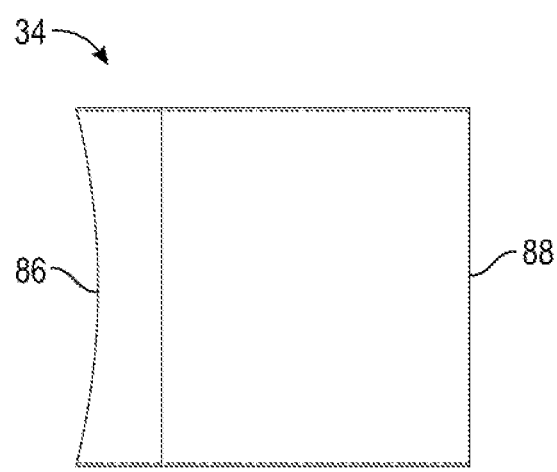
Figure 20:
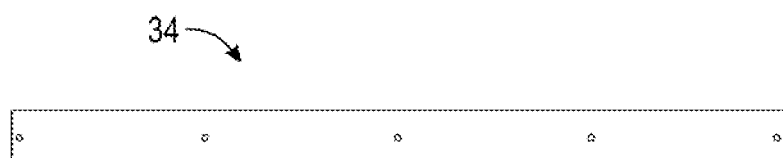
Figure 21A:
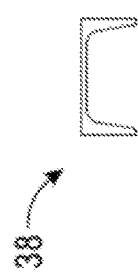
Figure 21B:
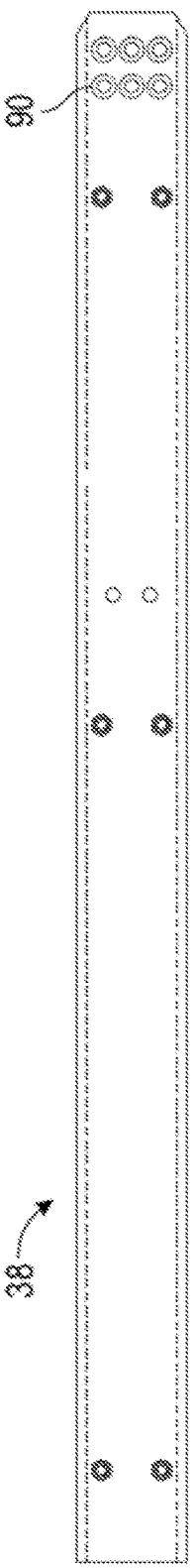
Figure 21C:
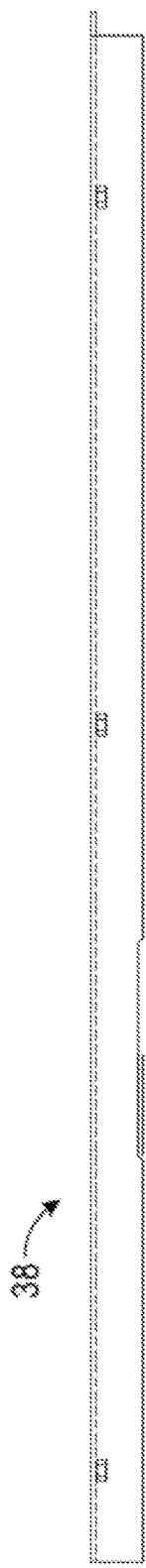
Figure 22:
Figure 24A:
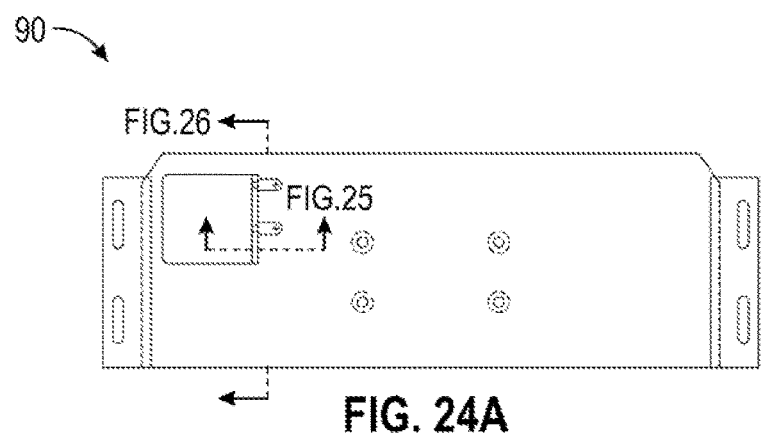
Figure 24B:
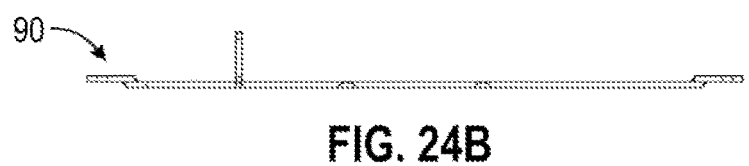
Figures 25, 26, 27:
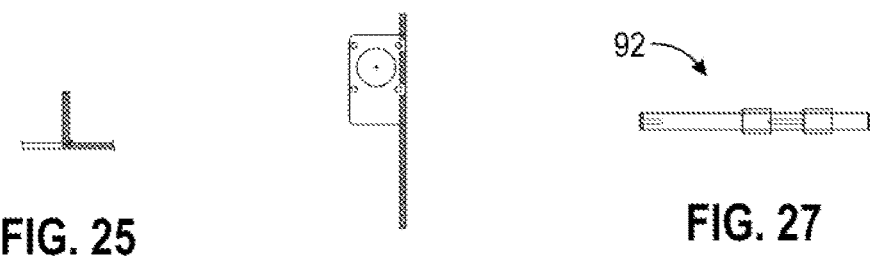
Figure 28A:
Figure 28B:
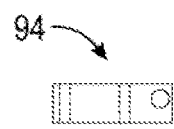
Figure 29A:
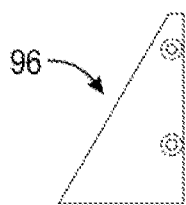
Figure 29B:
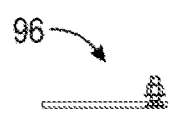

10C shows machined areas on the center plate;

FIGS. 11A and 11B illustrate a top and side view, respectively the bearing assembly;

FIG. 12A illustrates a base with two mounting holes;

FIG. 12B illustrates a wheel support;

FIGS. 12C to 12E illustrate a top, a side and a front view, respectively the intermediate roller assembly;

FIG. 13A illustrates the feature of the base plate with six holes;

FIGS. 13B to 13D illustrate a top, a side and a front view, respectively of the connector/roller assembly with six holes to join two base arc segments with one hub centering member;

FIG. 14 illustrates a top view of a reinforcing/segment connector plate;

FIG. 15 illustrates a top view of a top center plate;

FIG. 16 illustrates a top view of a top deck segment;

FIG. 17 illustrates a top view of a base centering plate;

FIG. 18 illustrates a top view of a base arc segment;

FIGS. 19A, 19B and 19C illustrate a front, a side and a top view, respectively of a ramp;

FIG. 20 illustrates the feature of a skirt;

FIGS. 21A, 21B and 21C illustrate a front, a top and a side view, respectively, of rotating deck support arm;

FIG. 22 illustrates a gear spacer;

FIGS. 23A and 23B illustrates a top and side view, respectively of a drive assembly;

FIGS. 24A and 24B illustrate a top and side view, respectively of a drive plate;

FIGS. 25 and 26 illustrate section-A-A and section B-B of drive plate;

FIG. 27 illustrates a drive shaft;

FIGS. 28A and 28B illustrate a top and side view, respectively of a bearing block; and FIGS. 29A and 29B illustrate a top and side view, respectively of a plate mount.

DETAILED DESCRIPTION OF THE EMBODIMENTS

The detailed description set forth below in connection with the appended drawings is intended as a description of exemplary embodiments in which the presently disclosed subject matter may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed turntable. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed turntable.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present subject matter encompasses present and future known equivalents to the known components referred to herein by way of illustration.

Although the present subject matter describes a turntable, it is to be further understood that numerous changes may arise in the details of the embodiments of the turntable. It is contemplated that all such changes and additional embodiments are within the spirit and true scope of this subject matter.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the subject matter and are not intended to limit the scope of the subject matter.

It should be understood that the present subject matter describes a turntable for the rotation of motorcycles or displays. The turntable includes base arc and centering segments and deck segments. The deck segment receives a vehicle. The turntable includes a center hub connecting the deck segments. The center hub comprises a center plate. The turntable includes arms extending from the center plate. The turntable comprises gear segments connected to the arms. The gear segment connects to a drive shaft via a worm gear. The turntable includes a motor connecting the drive shaft. The motor engages the drive shaft causing the gear to rotate, which in turn rotates the gear segment. Rotation of the gear segment causes the arms to rotate with support from the roller assemblies. Rotation of the arms rotates the center hub, which in turn rotates the deck segments with the vehicle.

Various features and embodiments of a turntable for the rotation of motorcycles, displays, or the like are explained in conjunction with the description of FIGS. 1 to 29B.

Figure 1:
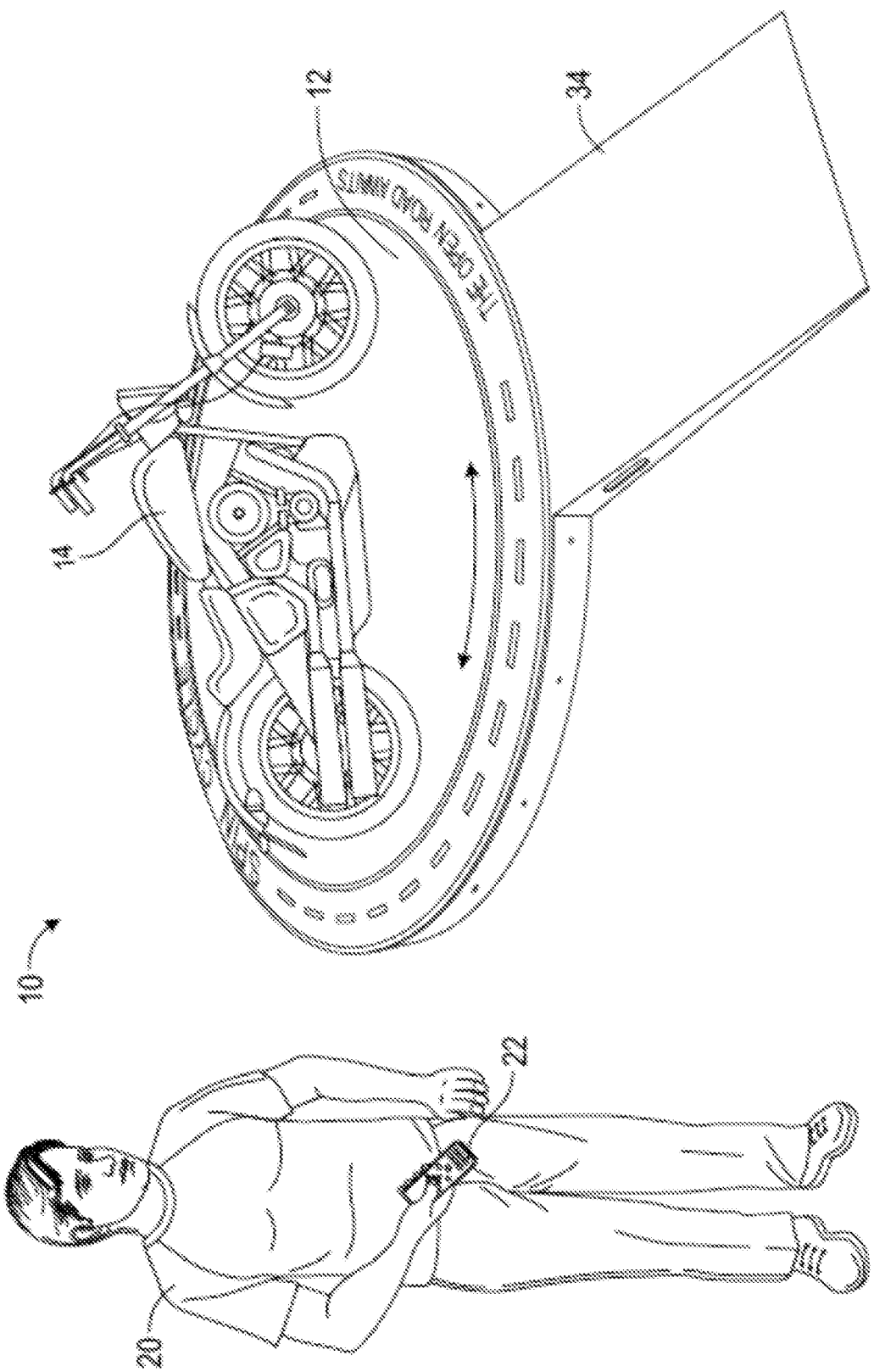
FIG. 1 illustrates an environment in which a turntable implements, in accordance with one embodiment of the present invention.

In one embodiment, the present subject matter discloses a turntable for the rotation of vehicles including motorcycles, displays, or the like. FIG. 1 shows an environment 10 in which turntable 12 implements, in accordance with one embodiment of the present invention. Turntable 12 allows a vehicle 14 such as a motorcycle to be rotated. Turntable 12 operates with the help of motor 16 controlled by controller 18. Motor 16 configures to cause turntable 12 to rotate by a drive assembly 52 (via cable or chain 19) of turntable 12. Motor 16 has suitable capacity to drive entire turntable 12 and to handle heavier loads and uneven or off-centered loads. Although FIG. 1 shows a single motor 16, a person skilled in the art understands that turntable 12 can include two or more motors 16. In such a case, two or more motors 16 operate synchronously and rotate turntable 12.

Controller 18 configures to control the motor's motion. In one example, controller 18 includes a button to control the operation of motor 16.

Although FIG. 1 shows controller 18 installed away from turntable 12, a person skilled in the art understands that motor 16 and controller 18 can be configured to install underneath or inside turntable 12 without departing from the scope of the present invention.

User 20 operates motor 16 using remote controller 22. In one example, remote controller 22 comes as a standalone device configured to transmit signals to control the operation of motor 16 to rotate turntable 12. In another example, remote controller 22 mounts at the wall of a garage (not shown) where turntable 12 installs. Remote controller 22 communicatively connects to motor 16 via wired or wireless device. Remote controller 22 presents user controls included on its surface of the control unit and/or software-based control, for example, through data packets or data signals.

Figure 2A:
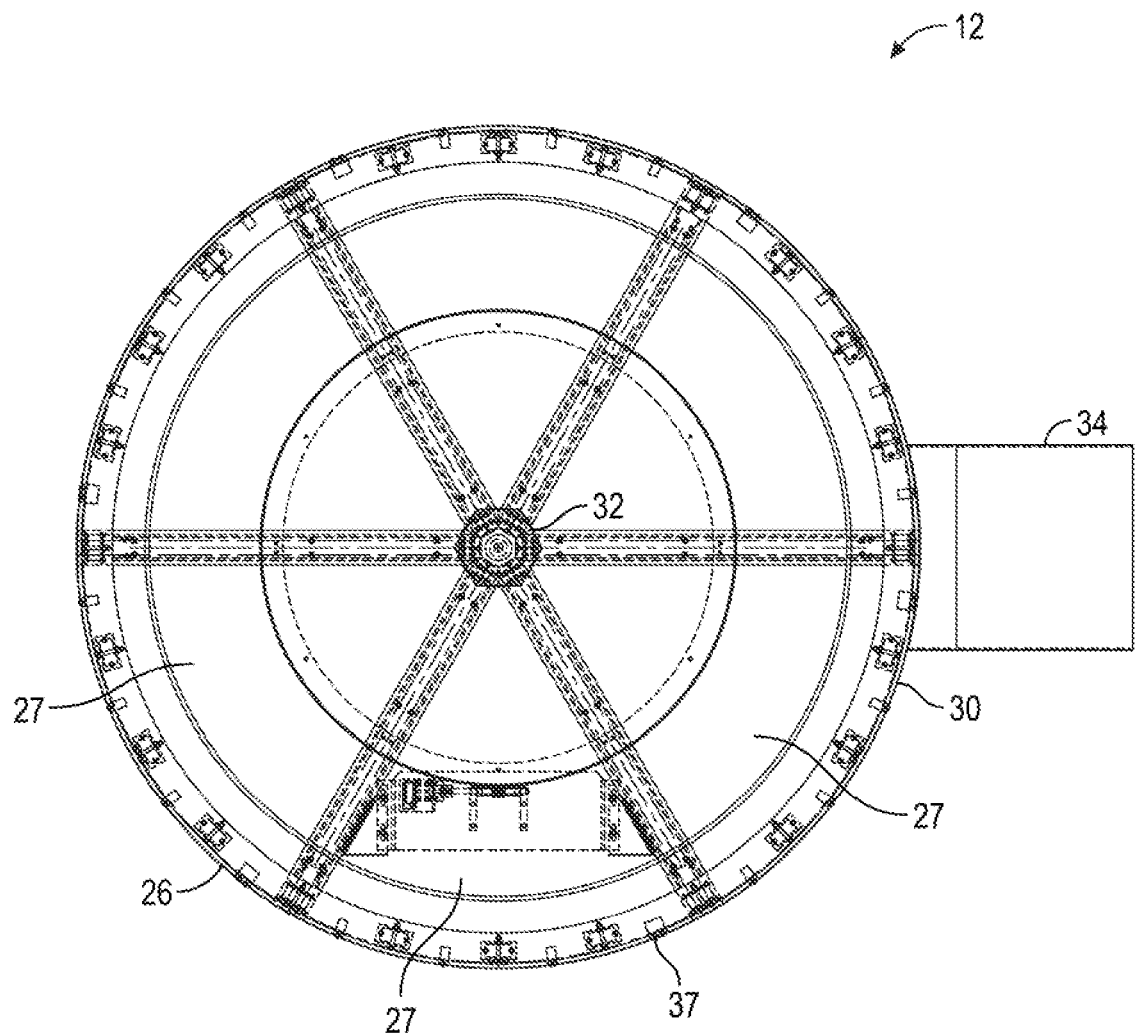
FIGS. 2A and 2B illustrate a top and side view, respectively of the turntable.
Figure 2B:
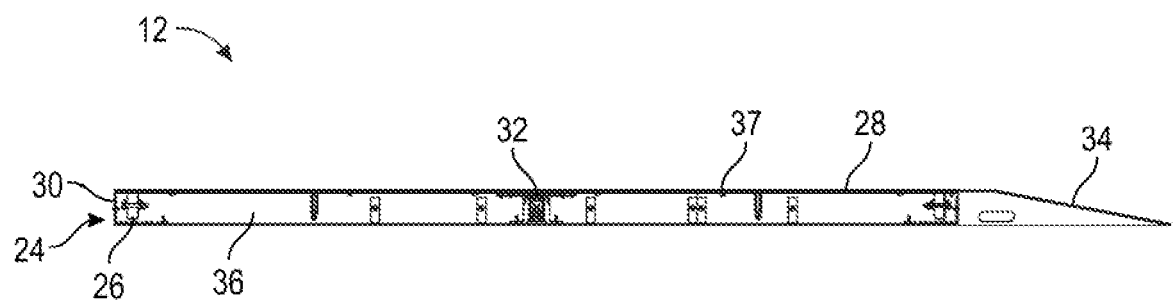

FIGS. 2A and 2B show a top and a side view, respectively of turntable 12, in accordance with one embodiment of the present invention. Turntable 12 includes deck assembly 24. Deck assembly 24 encompasses base arc and centering segments 26, plate segment 27 and deck segment 28 connected by base arc segment 30 (FIG. 2B). Base arc and centering segments 26 indicates a plate placed at the floor level. In one example, base arc and centering segments 26 form a circular configuration. Base arc and centering segments 26 are made of metal (steel or aluminium) or any other suitable material. Deck segment 28 indicates a plate that acts as a surface for resting and rotating vehicle 14. In one example, deck segment 28 comes in a wedge-shaped configuration. In another example, deck segment 28 comes in a wedge-shaped. When all deck (six deck segments, for example) segments 28 connect, they form a complete circular deck segment 28 and receive vehicle 14 (FIG. 1). Base arc segment 30 provides a material having suitable strength capable of withstanding the weight of vehicle 14 and user 20 when turntable 12 is in use, for example. Turntable 12 encompasses bottom center plate 32 at the center that rests on the floor. Further, turntable 12 includes ramp 34 extending from deck segment 28 at one side. Ramp 34 provides a slope-like structure from the floor level to deck segment 28 for positioning vehicle 14 over deck segment 28 when needed for rotation or taking out vehicle 14 for use. Further, turntable 12 presents skirt 36. In one implementation, turntable 12 includes fasteners 37 for connecting base arc and centering segments 26, deck segments 28 and base arc segments 30.

Figure 5:
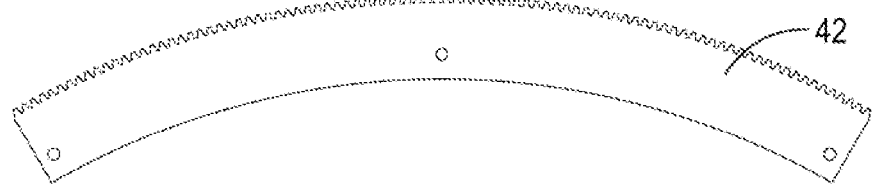
FIG. 5 illustrates the gear segment.

FIGS. 3A and 3B show a top and a side view, respectively of base and arm assemblies 24 (with deck segment 28 removed). Base and arm assemblies 24 includes C-Channel arms 38. In one example, six C-Channel arms 38 are provided, each mounting at 60 degrees from one another (FIG. 3A). Each C-Channel arm 38 includes gear segment spacer 40 which connects to gear segment 42. FIG. 3A shows hub assembly 44. FIG. 3B shows the feature of gear segment 42 connecting to C-Channel arm 38 separated by gear segment spacer 40. FIGS. 4A and 4B show a front and a side view, respectively, of gear segment spacer 40 connecting C-Channel arm 38 to gear segment 42 with nuts. Gear segments 42 form a circular configuration that mounts underneath arms and connecting to C-Channel arms 38 with gear segment spacer 40. FIG. 5 shows the feature of gear segment 42, in accordance with one embodiment of the present invention. In one example, gear segment 42 has teeth provided at 2.7 degrees.

Figure 6A:
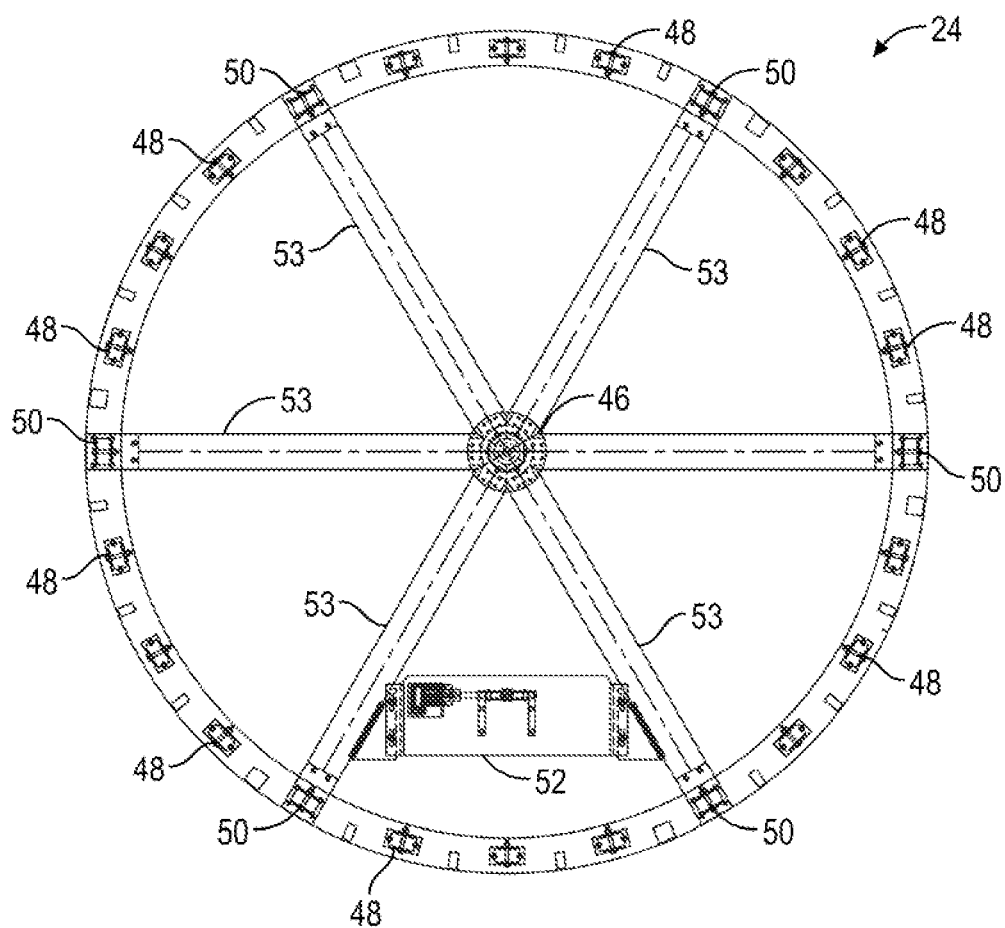
FIGS. 6A and 6B illustrate a top and side view of the base assembly having hub assembly, outer arc segments, stationary centering members, connector/roller assemblies and secondary roller assemblies.
Figure 6B:

Base assembly 24 includes hub assembly 46, roller assemblies 48, and connector/roller assemblies 50. FIGS. 6A and 6B show a top and a side view of base assembly 24 having hub assembly 46, connector/roller assembly 50 and roller assembly 48. Base assembly 24 further encompasses drive assembly 52 and centering members 53.

Figure 9A:
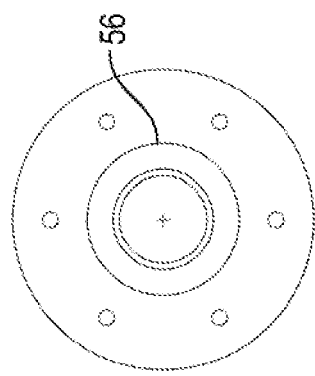
FIGS. 9A and 9B illustrate a top and side view, respectively of a hub.
Figure 9B:
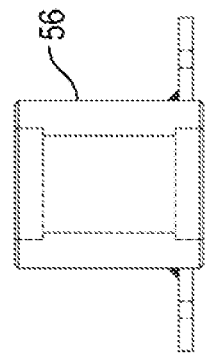
Figure 7:
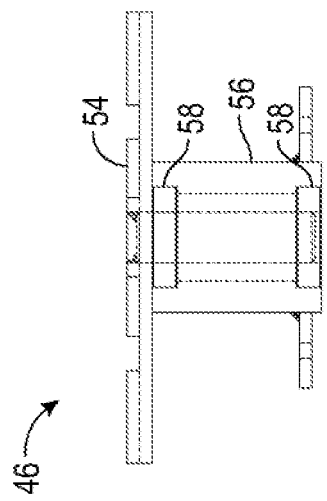
FIG. 7 illustrates the feature of a hub bearing assembly with top plate in place.
Figure 8:
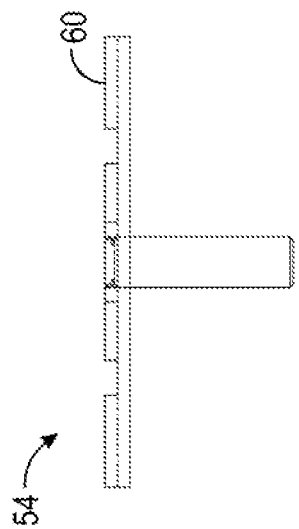
FIG. 8 illustrates the feature of a center hub/top plate.

Referring to FIG. 7, the feature of hub assembly 46 is explained. Hub assembly 46 mounts at the center of base and centering member assembly 24 and allows for mounting rotating C-Channel arms 38. Hub assembly 46 includes center hub 54, hub mount 56, and ball bearings 58. Center hub 54 encompasses hub mount 56 that extends from base arc and centering segments 26 up to deck segments 28 (FIGS. 9A and 9B). Hub mount 56 presents a material made of metal or any other suitable material that withstands the weight of turntable 12 and user 20 with vehicle 14. Center hub 54 further provides ball bearings 58 that allow hub assembly 46 to rotate 360 degrees. Hub assembly 46 includes top center plate 60. Top center plate 60 mounts at the top of center hub 54. Bottom center plate 32 mounts at the bottom of center hub 54 and is part of hub 56. FIG. 8 shows the feature of center hub 54 having top center plate 60.

FIGS. 10A and 10B show a top and a side view, respectively of top center plate 60, in accordance with one embodiment of the present invention. Top center plate 60 comes in a circular configuration. Top center plate 60 encompasses hexagonal section 62 at the center. Top center plate 60 presents machined areas 63 that allow attachment of rotating arms. (FIG. 10A). (Also shown in FIG. 10C.) Each of machined areas 63 includes holes 64 for connecting C-Channel arms 38 with fasteners (not shown). Top centre plate 60 includes boss part 66 as shown in FIGS. 11A and 11B.

FIGS. 12A to 12E show the construction of roller assemblies 48, in accordance with one embodiment of the present invention. FIG. 12A shows the base of intermediate roller assemblies 48 with two mounting holes. FIGS. 12D to 12E show other components of wheel assembly. Each roller assembly 48 includes wheel 68 that mounts to base arc and centering segments 26. Wheel 68 mounts to first frame or first caster 70 that mounts over first base 72. FIG. 12A shows base 72 and FIG. 12B shows the feature of frame 70. Frame 70 provides a material made of suitable material and takes the weight of first wheel 68. First frame 70 extends from first base 72 and allows for rotation of first wheel 68. Here, first wheel 68 mounts to first frame 70 with the help of fasteners 74. First base 72 mounts to base arc and centering segments 26 that rests on the floor level.

FIGS. 13A to 13D show the construction of connector/roller assembly or secondary roller assemblies 50, in accordance with one embodiment of the present invention. FIGS. 13B to 13D show the features of a connector/roller assembly 50, in accordance with one embodiment of the present invention. The six-hole bottom plate allows connection of two base arc segments to each other and to a centering plate extending to the center hub at floor level. Connector/roller assemblies 50 has similar mechanism like roller assemblies 48. Each connector/roller assemblies 50 include wheel 76. Wheel 76 mounts to frame or caster 78 that mounts over base 80. FIG. 13A shows base 80 with six holes. Frame 78 has shape similar to first frame 70. Frame 78 provides a material made of a suitable material and takes the weight of wheel 76. Frame 78 extends from base 80 and allows for rotation of wheel 76. Here, wheel 76 mounts to frame 78 with the help of fasteners 82. Base 80 mounts to base arc and centering segments 26 that rests on the floor level.

As specified above, base assembly 24 encompasses arc segments 24, hub centering members, connector/wheel assemblies, hub, and motor/gear mount. FIG. 14 shows the reinforcing segment between the rollers and the top deck. Here, the reinforcing/segment connector plate offsets, spanning the joint beneath two deck plates. FIG. 15 shows the feature of top center plate 60. FIG. 16 shows the feature of (top) deck segment 28. FIG. 17 shows the feature of hub centering member 53 (base centering plate) including holes 83 for mounting centering member 53 to center hub 54. FIG. 18 shows the feature of base arc segment 30.

FIG. 19A to 19C show the feature of ramp 34, in accordance with one embodiment of the present invention. Ramp 34 is made of material capable of withstanding weight of vehicle 14 and user 20. Ramp 34 encompasses ramp base 84. Ramp 34 presents ramp platform 86 that has a height relative to deck segment 28. Ramp platform 86 presents a curvature to match the curvature of turntable 12 (FIG. 2A). Ramp 34 includes slope 88 extending from the floor to deck segment 28. Ramp 34 removably mounts to turntable 12 such that ramp 34 mounts to turntable 12 at any given position depending on the need. FIG. 20 shows the feature of skirt 36.

FIGS. 21A, 21B and 21C illustrate a front (21A), a top (21B) and a side view (21C), respectively, of rotating C-Channel arm 38, in accordance with one embodiment of the present invention. Each arm 38 include arm holes 90. Here, C-Channel arm 38 includes six arm holes 90 for connecting C-Channel arm 38 to machined area of hexagonal section 62 of top center plate 60. As specified above, hexagonal section 62 includes six milled/machined areas 63, each having tapped holes 64. Here, arm holes 90 align with holes 64 and connect with fasteners (not shown). FIG. 22 shows the feature of gear segment spacer 40, in accordance with one embodiment of the present invention. As specified above, gear segment spacer 40 provides a gap between C-Channel arms 38 and gear segment 42 and ensures they do not come in contact during operation of turntable 12.

FIGS. 23A and 23B show a top and a side view, respectively of drive assembly 52, in accordance with one embodiment of the present invention. Drive assembly 52 includes drive plate 90 for placing the components of drive assembly 52. FIG. 24 shows the feature of drive plate 90. FIGS. 25 and 26 show the features of drive plate 90. Drive assembly 90 encompasses drive shaft 92 extending over the entire or substantial length of drive assembly 52. FIG. 27 shows drive shaft 92. Drive shaft 92 connects with the help of bearing blocks 94. Here, drive shaft 92 draws through bearing blocks 94 and receives worm gear 98. Worm gear 98 meshes with gear segment 42.

FIGS. 28A and 28B show a top and a side view, respectively of bearing block 94. Bearing blocks 94 ensure drive assembly 52 connects at a height with sufficient clearance from the floor. Drive assembly 52 encompasses plate mount 96 that helps to connect drive plate 90 to base arc and centering segments 26. FIGS. 29A and 29B show a top and side view, respectively of plate mount 96. Drive shaft 92 includes worm gear 98 that connects to gear segment 42. Here, teeth of worm gear 98 match the teeth of gear segment 42. In one example, the teeth on worm gear 98 have a 2.7 degrees that match teeth of gear segment 42. As specified above, gear segment 42 mounts to C-Channel arms 38 with a gap separated by gear segment spacer 40 (FIG. 23B).

Further, drive shaft 92 presents flange bearing 100, shaft collar 102, shaft coupling 104 and spider 106 for properly mounting and supporting the operation of drive plate 90. In addition, drive assembly 52 provides clear path 108 for rotation of drive plate 90 together with flange bearing 100, shaft collar 102, shaft coupling 104 and spider 106. Drive assembly 52 includes nuts 110, 112 for connecting bearing blocks 94, and flange bearing 100, shaft collar 102, shaft coupling 104 and spider 106, respectively.

Referring to at least FIGS. 1, 2A, 2B, 21A and 21B, operation of turntable 12 is explained. User 20 rides/drives vehicle 14 over ramp 34 and places vehicle 14 on turntable deck segment 28 (FIG. 1). Subsequently, user 20 manually operates controller 18 or uses remote controller 22 to rotate turntable 12 to park/position vehicle 14 in a desired direction. User 20 actuates motor 16 to rotate turntable 12 at 1.5 rotation per minute (rpm). Here, user 20 controls the motor 16 to engage drive shaft 92. Specifically, motor 16 operates and drives drive shaft 92. Drive shaft 92 rotates, which in turn rotates worm gear 98 causing gear segment 42 to rotate. As specified above, gear segment 42 connects to C-Channel arms 38 via gear segment spacer 40. Rotation of gear segment 42 causes C-Channel arms 38 to rotate clockwise and/or counter clockwise direction. C-Channel arms 38 rotate freely with the help of hub and roller assemblies 48 and 50. As specified above, C-Channel arms 38 connect to hub assembly 46 positioned at the center, which connects to deck segment 28 upon which vehicle 14 rests. As C-Channel arms 38 rotate due to continuous operation of motor 16, deck segment 28 rotates with vehicle 14 on it.

Here, user 20 controls the rotation of turntable 12 (deck segment 28) depending up on the direction of vehicle 14 he/she wishes to park or take out vehicle 14 (via ramp 34) from turntable 12. The speed of motor 16 progressively increases as it starts to operate at desired speed (soft start) and descends progressively as it reaches the stop position to provide smooth operation of motor 16 and turntable 12. Controller 18 and/or remote controller 22 includes controls such as rotation and stop rotation. Activating the rotation control rotates turntable 12 in counter clockwise direction. Activating stop rotation control stops rotation of turntable 12.

Although the presently disclosed turntable is explained considered it is used for rotation of vehicles such as motorcycles, a person skilled in the art understands the turntable may also be used for rotating display boards, other automobiles such as cars, for example. The turntable is packaged as a kit for easy installation by user/homeowner. The compact size of the parts of the kit allow for easy shipment and easy erection by the user.

Based on the above, it is evident that the presently disclosed turntable can be used for rotating vehicles/displays around a 360 degree arc.

A person skilled in the art appreciates that the turntable may come in a variety of sizes depending on the need and comfort of the user. Further, different materials in addition to or instead of materials described herein may also be used and such implementations may be construed to be within the scope of the present subject matter. Further, many changes in the design and placement of components may take place without deviating from the scope of the presently disclosed turntable.

In the above description, numerous specific details are set forth such as examples of some embodiments, specific components, devices, methods, in order to provide a thorough understanding of embodiments of the present subject matter. It will be apparent to a person of ordinary skill in the art that these specific details need not be employed, and should not be construed to limit the scope of the subject matter.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the subject matter, it is intended that all matter contained in the above description or shown in the accompanying drawings shall be interpreted as illustrative and not in a limiting sense.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. It is contemplated that additional embodiments are within the spirit and true scope of the disclosed subject matter.

What is claimed is:

1. A turntable rotation device for assisting with safe and controlled directional movement and pivoting of stationary vehicles, comprising:
    a base arc and centering segment and a deck segment, wherein said base arc and centering segment mount at a floor level and said deck segment mounts at a height from said base arc and centering segments, and wherein said deck segment receives a vehicle;
    a center hub comprising hub centering members, wherein said hub centering members receive said deck segment, wherein said center hub comprises a center plate having a hexagonal section, wherein said hexagonal section comprises areas, each area extending from a side of said hexagonal section, and wherein each area comprises first holes;
    C channel arms extending from said center plate and positioning underneath said hub centering members, wherein each of said C-channel arms comprises second holes at one end and roller assemblies at other end, and wherein said second holes align with said first holes of said center plate and connect a C-channel arm of said C-channel arms at the side of said hexagonal section at said center plate;
    a gear segment connecting said C-channel arms, wherein said gear segment connects underside of said C-channel arms via a gear segment spacer, and wherein said gear segment spacer provides a gap between said C-channel arms and said gear segment;
    a drive shaft connecting said gear segment via a worm gear; and
    a motor connecting said drive shaft,
    wherein said motor engages said drive shaft causing said worm gear to rotate, which in turn rotates said gear segment, wherein rotation of said gear segment causes said C-channel arms to rotate with support from said roller assemblies, and wherein rotation of said C-channel arms rotates said center hub, which in turn rotates said hub centering members receiving said deck segment with said vehicle.

2. The turntable of claim 1, further comprises a controller for operating said motor to rotate said turntable in clockwise or counter clockwise direction.

3. The turntable of claim 1, wherein said deck segments comprise a ramp for loading said vehicle onto said deck segments.

4. The turntable of claim 1, wherein said roller assemblies comprise wheels that allow for rotation of said C-channel arms.

5. The turntable of claim 1, wherein said drive shaft mounts to bearing blocks providing sufficient clearance from the floor.

6. A method of providing a turntable rotation device for assisting with safe and controlled directional movement and pivoting of stationary vehicles, said method comprising steps of:
    providing a base arc and centering segment and a deck segment, said base arc and centering segment mounting at a floor level and said deck segment mounting at a height from said base arc and centering segment, said deck segment receiving a vehicle;
    providing a center hub comprising hub centering members, said hub centering members receiving said deck segment, said center hub comprising a center plate having a hexagonal section, said hexagonal section comprising areas, each area extending from a side of said hexagonal section and having first holes;
    providing C-channel arms extending from said center plate and positioning underneath said hub centering members, each of said C-channel arms comprising second holes at one end and roller assemblies at other end;
    aligning said second holes with said first holes of said center plate for connecting a C-channel arm of said C-channel arms at the side of said hexagonal section at said center plate;
    providing a gear segment connected to said C-channel arms, said gear segment connecting underside of said C-channel arms via a gear segment spacer, said gear segment spacer providing a gap between said C-channel arms and said gear segment;

providing a drive shaft connecting said gear segment via a worm gear;

providing a motor connecting said drive shaft;

operating said motor for driving said drive shaft for rotating said gear segment via said worm gear, causing said C-channel arms to rotate with support from said roller assemblies; and rotating said center hub with rotation of said C-channel arms to rotate said hub centering members receiving said deck segment with said vehicle.

7. The method of claim 6, further comprising providing a controller for operating said motor for rotating said turntable in clockwise or counter clockwise direction.

8. The method of claim 6, further comprising providing a ramp extending from said deck segments for loading said vehicle onto said deck segments.

9. The method of claim 6, further comprising providing wheels in said roller assemblies for rotation of said C-channel arms and said deck segments.

\* \* \* \* \*